United States Patent [19]

Jung et al.

[11] Patent Number: 5,628,468
[45] Date of Patent: May 13, 1997

[54] OPTICAL TAPE CASSETTE

[75] Inventors: Seung-tae Jung; Jung-hoe Kim, both of Seoul; Dong-heon Kang, Suwon; Hyeon-yong Jang, Seoul, all of Rep. of Korea

[73] Assignee: Samsung Electronics Company, Ltd., Suwon, Rep. of Korea

[21] Appl. No.: 390,865

[22] Filed: Feb. 17, 1995

Related U.S. Application Data

[62] Division of Ser. No. 998,920, Dec. 30, 1992, abandoned.

[30] Foreign Application Priority Data

May 30, 1992 [KR] Rep. of Korea ............... 92-9470

[51] Int. Cl.⁶ ..................... G11B 23/00; G11B 25/00
[52] U.S. Cl. ....................... 242/345.1; 369/259
[58] Field of Search ............ 242/345.1; 360/132; 369/259

[56] References Cited

U.S. PATENT DOCUMENTS 3,974,975  8/1976  Holmes ................... 360/132 X
4,525,828  7/1985  Higashiyama et al. ........ 369/111
4,581,667  4/1986  Gerfast ................... 360/99.12
4,764,826  8/1988  Estes ..................... 360/93
4,807,213  2/1989  Chung et al. .............. 369/46
4,939,715  7/1990  Vogelgesang et al. ........ 360/93
5,216,558  6/1993  Griffith et al. .......... 360/99.02 X

FOREIGN PATENT DOCUMENTS 61-199267  9/1986  Japan .................... 360/99.12

*Primary Examiner*—John Q. Nguyen
*Attorney, Agent, or Firm*—Rothwell, Figg, Ernst & Kurz

[57] ABSTRACT

An optical tape cassette and a player for using the cassette. The optical tape cassette includes a drum on which optical tape is wound and two tape reels for supplying and winding the tape. The cassette player includes a driver having two rotating members which can be connected to the drum and tape take-up reel for driving the drum and tape take-up reel, respectively, and an optical pickup for projecting a light beam onto the optical tape which is wound about the periphery of the drum, thereby realizing a simplified structure and easy handling for home use.

9 Claims, 5 Drawing Sheets

OPTICAL TAPE CASSETTE

This is a division of application Ser. No. 07/998,920, filed Dec. 30, 1992, abandoned.

BACKGROUND OF THE INVENTION

The present invention relates generally to an optical tape cassette for vast information storage and an optical tape cassette player for recording/reproducing desired information using the tape cassette, and more particularly to an optical tape cassette and player which are easy to handle and are practical for large-capacity auxiliary memories for computers or optical video cassette recorders (OVCR) for home use.

Generally, an optical recording medium has a higher writing density than that of a magnetic recording medium, and has a longer life because a recording/reproducing optical pickup has no contact with the medium. For vast storage of information such as that needed for computers, satellites or VCRs used with high definition television (HDTV), a large-capacity recording medium is required. Therefore, optical recording media are preferable to magnetic recording media, and more attention is being paid to tape-type optical recording media which have a wider recording area than the disk-type whose recording area is considered to be currently at maximum.

U.S. Pat. Nos. 4,525,828, 4,807,213 and 4,939,715 disclose systems for performing the recording/reproducing of information using tape-type optical recording media. Owing to these patents, the practicality of auxiliary memory for computers or OVCRs for home use, using optical tape, is greatly increased. However, the following technical difficulties still exist in the construction of individual systems.

In U.S. Pat. Nos. 4,525,828 and 4,807,213, in which the apparatus are constructed to scan optical tape in a similar manner as that used for VCRs using a rotating drum having optical pickup elements, the disclosed optical tape travelling system as well as the drum is complicated to increase the size and cost of the apparatus which is in turn unsuitable for home use. Since an objective lens as one of the optical pickup elements is rotated along with the drum, focus/tracking servo operation is impracticable or nearly impossible, and since the optical tape is exposed (outside the cassette housing) during the recording/reproducing, hum frequently takes place due to gathered dust.

In U.S. Pat. No 4,939,715, an optical tape reel is installed in a drum and a recording/reproducing optical pickup is separately provided, greatly simplifying the driving method. However, the apparatus still has problems in realizing an optical tape cassette of high practical use. Further, since two optical tape reels and their respective reel driving motors are constructed to be driven with the drum, a driving motor for the drum carries a heavy burden. In addition, due to tension bars of the optical tape installed in the drum, the geometric center and the center of mass of the drum cannot be coincident and so the drum cannot be driven at high speed, contrary to the drum for VCRs. This makes the apparatus unsuitable for high-definition video recording.

SUMMARY OF THE INVENTION

Therefore, it is an object of the present invention to provide an optical tape cassette having a simplified structure which has two optical tape reels mounted on a drum that rotates at high speed.

It is another object of the present invention to provide an optical tape cassette player having a simplified structure which facilitates loading and driving an optical tape cassette and recording/reproducing information.

In one aspect of the present invention, there is provided an optical tape cassette for receiving optical tape comprising a cassette housing having a light-passing window on the front thereof and a center hole in the bottom thereof and a drum rotatably inserted in the cassette housing, the drum having an outgoing hole and an incoming hole for the optical tape. The drum has a cylindrical periphery on which the optical tape is slantingly wound between the outgoing hole and the incoming hole, and a center boss which is connected to an external rotating member via the center hole of the cassette housing. Two tape reels rotatably inserted in the upper portion of the drum are composed of a supply tape reel for supplying the optical tape via the outgoing hole and a tape take-up reel for winding the optical tape via the incoming hole, the take-up reel having a hub connected to another external rotating member.

In another aspect of the present invention, there is provided a cassette player for driving an optical tape cassette having a drum on which optical tape is wound and two tape reels for supplying or winding the optical tape in said drum so as to perform optical recording and/or reproducing of information. The player comprises support means for supporting the optical tape cassette at a given height and driving means in the form of two rotating members connected to the drum and the tape take-up reel for driving the drum and tape take-up reel, respectively. The player also includes an optical pickup for scanning the optical tape (which tape is wound about the periphery of the drum) with a light beam and for detecting the light beam reflected from the optical tape.

The optical tape cassette and player of the present invention can be constructed so that driving devices rotate two coaxial rotating members with the tape cassette automatically mounted on the player so as to connect the center boss formed in the drum to one rotating member, and to connect the hub of the take-up reel, which is located in the lower portion of the drum, to another rotation member. Since the supply reel and take-up reel of the optical tape are disposed one above the other in the drum, i.e., at different heights, the tape wound on the periphery of the drum via the tape outgoing hole and incoming hole of the drum is disposed at a slant. In this state, the drum and take-up reel are rotated and the optical pickup is simultaneously operated so that the optical recording and reproducing of information are carried out.

If the rotational velocity of the drum is fixed and the rotational speed of the take-up reel is slightly faster than that of the drum, the optical tape travels from the supply reel to the take-up reel. By doing this, forward recording and reproduction are made possible. If the drum and take-up reel are rotated at the same velocity, the optical tape substantially does not travel and enables reproduction of still images.

Meanwhile, when the rotation resistance of the supply reel is increased and the rotational speed of the take-up reel is slower than that of the drum, the optical tape travels in the reverse direction, which enables reverse reproducing and rewinding. Accordingly, the present invention can perform all the functions of the conventional VCR, has a simplified structure, and is easy to handle.

The above objects and other advantages of the present invention will become more apparent by describing in detail a preferred embodiment thereof with reference to the attached drawings in which:

DETAILED DESCRIPTION OF THE INVENTION

Figure 1:
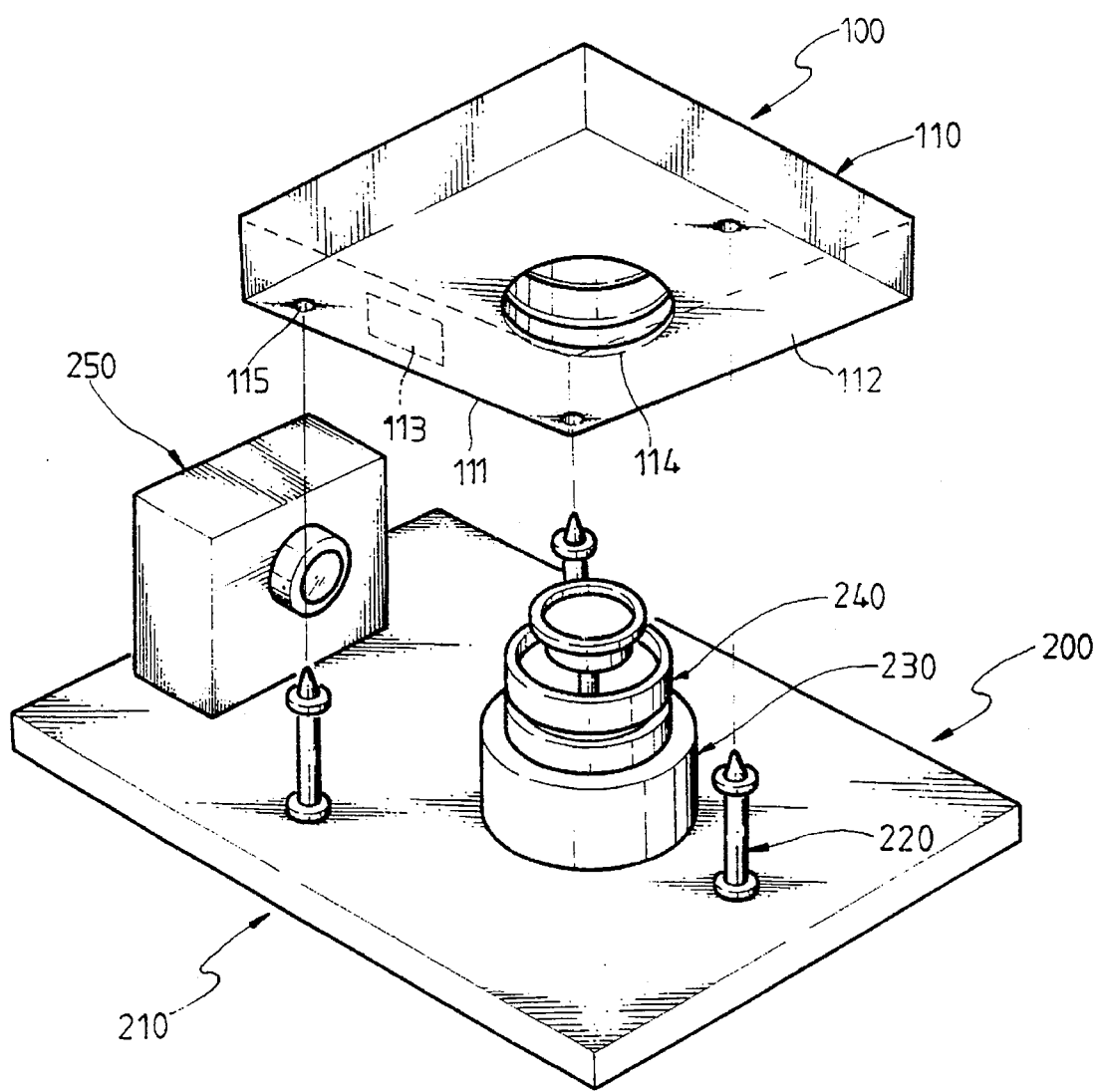
FIG. 1 is a perspective view of an optical tape cassette and player according to the present invention.
Figure 2:
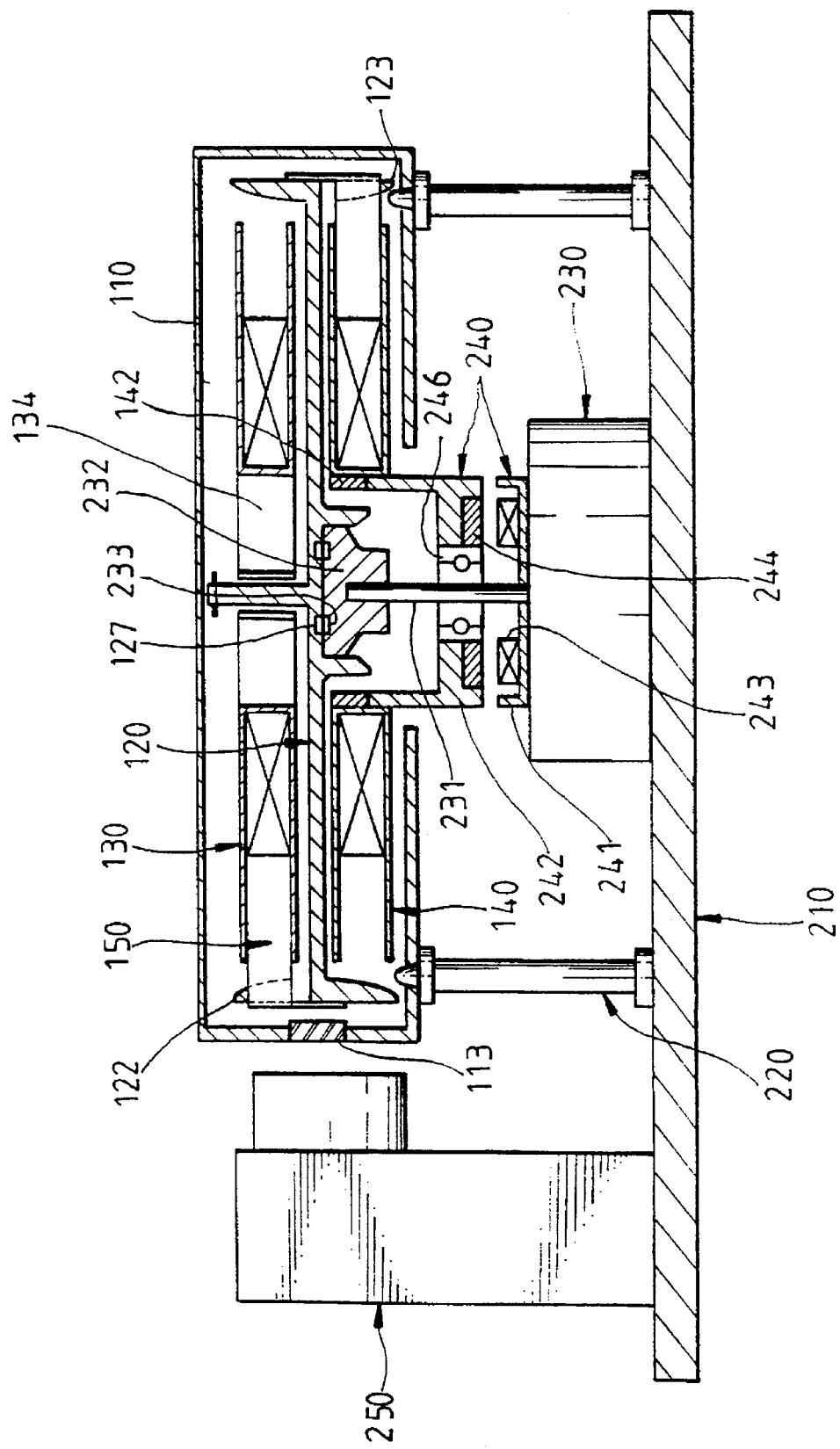
FIG. 2 is a cross-sectional view in which the optical tape cassette of the present invention is mounted on the player.

Referring to FIGS. 1 and 2, reference numeral 100 represents an optical tape cassette in accordance with the present invention, and reference numeral 200 represents a cassette player according to the present invention. Optical tape cassette 100 is loaded on cassette player 200 by a cassette loading device (not shown). The cassette loading device may be structured similar to, for example, the cassette loading device of a typical VCR, which will not be described or depicted.

Optical tape cassette 100 has a cassette housing 110 having rectangular planar contours. A light-passing window 113 is provided on the front 111 of cassette housing 110. A center hole 114 of a given diameter and three support holes 115 are provided on the bottom 112 of cassette housing 110. A drum 120 is installed so as to be rotatable in cassette housing 110. A tape supply reel 130 and tape take-up reel 140 are positioned one above the other and are rotatable within drum 120.

Figure 3:
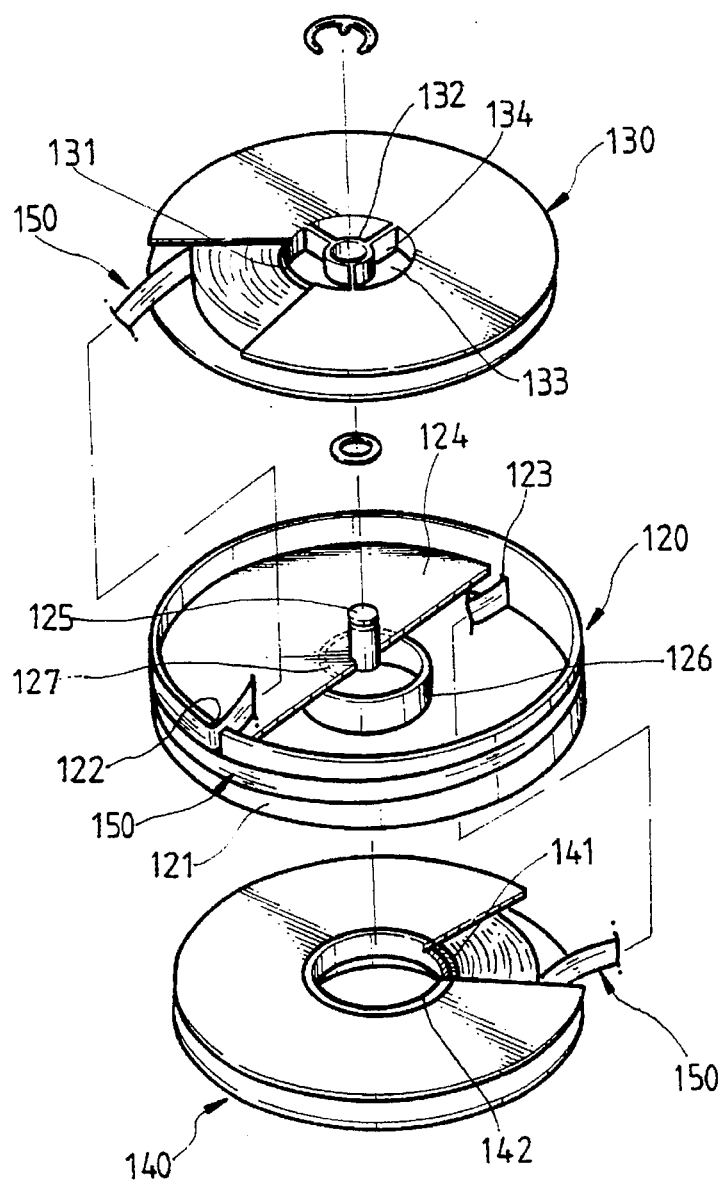
FIG. 3 is an exploded view illustrating the structure of the optical tape cassette according to the present invention.

Referring to FIG. 3, tape outgoing hole 122 and tape incoming hole 123 are opposingly formed on the periphery 121 of drum 120 at different heights. An intermediate plate 124 is provided for dividing the interior space of the drum 120 into upper and lower portions. A support shaft 125 is installed above intermediate plate 124 and a center boss 126 is provided under the plate. A permanent magnet 127 is installed inside center boss 126.

Tape supply reel 130 and tape take-up reel 140 wind optical tape 150 inside drum 120. A support portion 132 supported by support shaft 125 is formed in the upper-positioned tape supply reel 130, and a space 133 and a plurality of wings 134 for equally dividing space 133 are provided between support portion 132 and hub 131. The lower-positioned tape take-up reel 140 has a hub 141 of an inner diameter larger than that of center boss 126. A permanent magnet 142 is installed on the interior of hub 141.

Optical tape 150 is wound more than once around the periphery 121 of drum 120 and extends from tape supply reel 130 through outgoing hole 122 of drum 120 to tape take-up reel 140 via incoming hole 123 of drum 120.

Cassette player 200 of the present invention, as shown in FIGS. 1 and 2, includes three support rods 220 provided on base 210 for supporting optical tape cassette 100 at a given height, two motors 230 and 240 for respectively driving drum 120 and tape reel 140 within cassette housing 110 via center hole 114, and an optical pickup 250 for projecting a light beam toward optical tape 150 through light-passing window 113 of cassette 100. The upper portion of each of support rods 220 is inserted into support holes 115 of optical tape cassette 100 so as to support cassette housing 110 at a given height relative to cassette player 200.

One of the two motors 230 and 240 is for driving drum 120 and the other is for driving tape take-up reel 140. Motor 230 for driving drum 120 is installed directly on base 210. In the motor 230, a rotating member 232, having a size allowing its insertion into center boss 126 of drum 120, is coupled onto the top of a rotating shaft 231. A permanent magnet 233 is provided in rotating member 232 and is attracted to permanent magnet 127 provided in center boss 126, the magnets 127 and 233 having opposite polarity. The structure of motor 230 is conventional and thus will not be described. Motor 240 for driving tape take-up reel 140 comprises a fixed member 241 installed on motor 230 and a hollow rotating member 242 supported by a bearing 246 on rotating shaft 231 of motor 230. Rotating member 242 is inserted between center boss 126 of drum 120 and hub 141 of tape take-up reel 140 via center hole 114 of cassette housing 110 (shown in FIG. 1), and is made of a metal material attracted by the permanent magnet 142 provided in hub 141. Fixed member 241 and rotating member 242 have a stator coil 243 and rotator magnet 244, respectively, which are the elements of an ordinary brushless DC motor.

Figure 4:
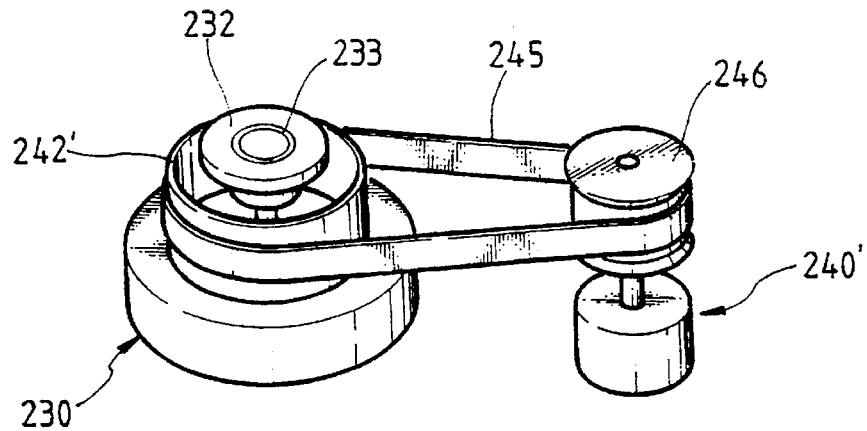
FIG. 4 is a perspective view illustrating another embodiment of a driving device incorporated in the cassette player of the present invention.

FIG. 4 illustrates another embodiment of the above-described driving device. In FIG. 4, a motor 240' for driving tape take-up reel 140 is installed adjacent to motor 230 and a rotating member 242', bearing-supported by rotating shaft 231 of motor 230, is driven by a belt 245 and a pulley 246.

Figure 5:
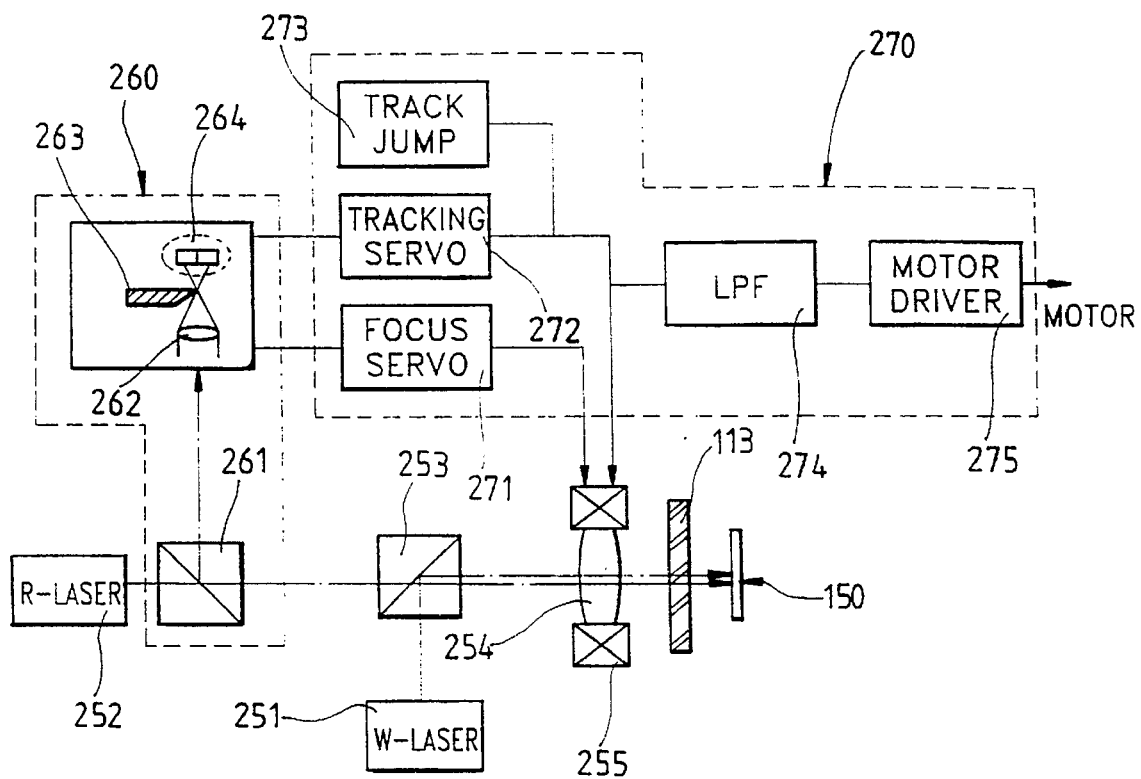
FIG. 5 is a schematic diagram illustrating the optical structure and circuitry of the recording/reproducing optical pickup incorporated in the cassette player according to the present invention.

As shown in FIG. 5, optical pickup 250 includes a writing laser 251 and a reproducing laser 252 for emitting laser beams having different wavelengths during recording and reproducing, and a dichromatic filter 253 for reflecting a light beam during recording and transmitting a light beam during reproducing so as to nearly coincide the two light paths. The pickup 250 also includes an objective lens 254 for focusing the light beams onto optical tape 150 inside light-passing window 113, a detecting optical system 260 for detecting the light beam reflected by optical tape 150, and an actuator 255 for minutely driving objective lens 254 horizontally and vertically. The optical pickup further comprises a system 270 having a tracking servo 272, a focusing servo 271 and a track jump circuit 273 for transmitting a signal from detecting optical system 260 to actuator 255. The system 270 further includes a low-pass filter 274 and motor driver 275 for transmitting an output signal among those of tracking servo 272, track jump circuit 273 and motor 230 for driving drum 120.

The recording and reproducing of information by optical tape cassette 100 and cassette player 200 will be described below.

As shown in FIG. 2, when optical tape cassette 100 is mounted on support rods 220 of cassette player 200, rotating members 232 and 242 of motors 230 and 240 are inserted into center boss 126 of drum 120 and hub 141 of tape reel 140 respectively. At the same time, rotating members 232 and 242 are connected to the center boss 126 and hub 141, respectively, by permanent magnets 127, 233 and 142. In this state, when motors 230 and 240 are operated, drum 120 and tape reel 140 are rotated to perform the following various functions, depending on their respective rotational speeds.

Specifically, when drum 120 and tape take-up reel 140 are rotated at the same circumferential velocity, optical tape 150 is in the state in which it does not travel along the periphery 121 of drum 120 and is stationary. In order to make optical tape 150 travel along the periphery 121 of drum 120, one of the drum 120 and the take-up reel 140 should be rotated faster or slower than the other. When drum 120 and tape take-up reel 140 both are rotated counter-clockwise, if the rotation speed of tape take-up reel 140 is faster than that of drum 120, optical tape 150 proceeds forward and, conversely, the tape 150 proceeds in a reverse direction if the take-up reel's speed is slower than that of the drum. In other words, by varying the rotational speed of tape take-up reel 140, the forward mode and the reverse playback mode of optical tape 150, as well as the still mode of tape 150, can be properly selected. Tape supply reel 130 is rotated according to the rotation of drum 120 since the reel 130 is disposed on drum 120. During the rotation of the tape supply reel 130, fins 134 of reel 130 produce air turbulence to create rotation resistance. Thus, tape supply reel 130 is not rotated at the same velocity as that of drum 120 and generally rotates at a slower speed. This permits reverse playback and rewinding of tape 150. Specifically, optical tape 150 travels along the periphery 121 of drum 120 while maintaining its tightness thereto. In short, in the optical tape cassette 100 of the present invention the drum 120 may be constructed in a centrifugal structure and can be rotated at a high speed.

The recording and reproducing of information from optical pickup 250 will now be described.

Figure 6:
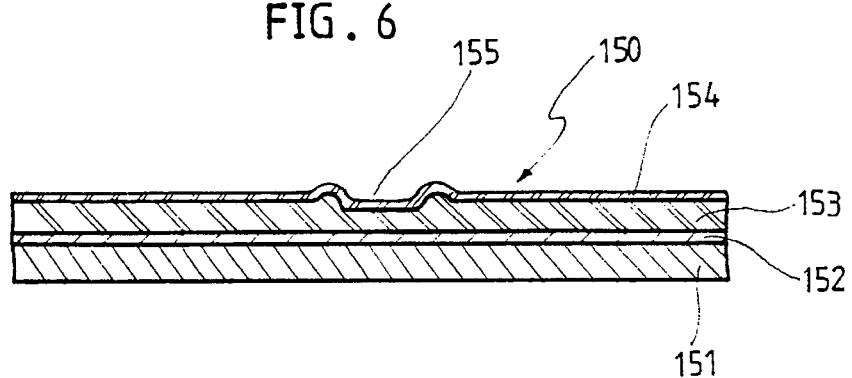
FIG. 6 is a cross-sectional view of an optical tape used in the present invention.
Figure 7A:
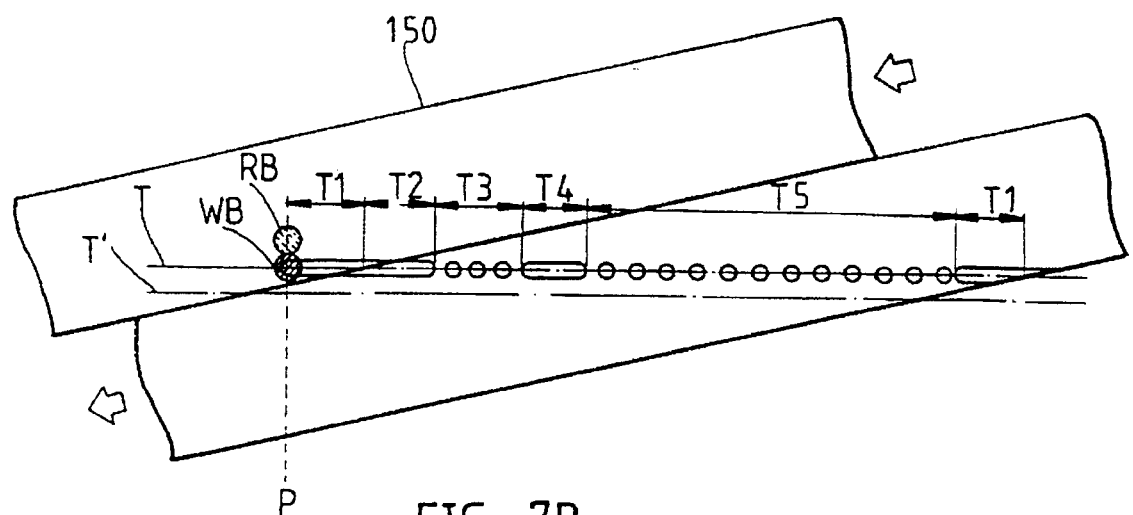
FIGS. 7A and 7B are schematics for explaining the writing format in which information is recorded on the optical tape according to the present invention.
Figure 7B:
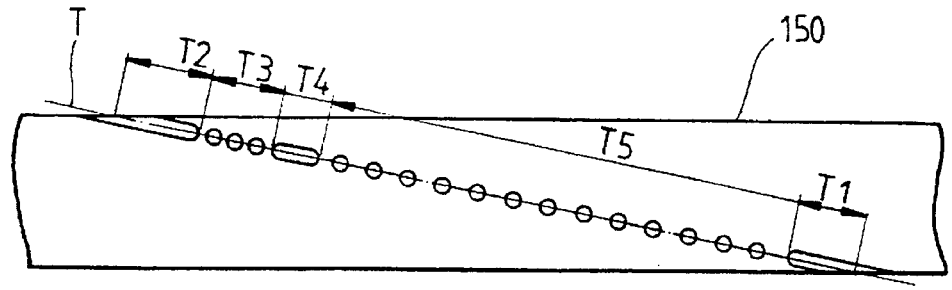

When recording an image, as shown in FIG. 5, writing laser 251 is operated to emit a light beam modulated according to the information to be recorded. The emitted light beam is reflected by dichromatic filter 253 and is focused onto optical tape 150 by objective lens 254. Optical tape 150, as shown in FIG. 6, has a support layer 151, a reflection layer 152, a writing layer 153 and a protecting layer 154. During the recording, the light beam forms pits 155 in writing layer 153. Generally, the pits are of differing forms depending on the physical properties of the writing layer. As shown in FIGS. 7A and 7B, pits 155 are arranged in a discontinuous pattern along slanted track T on optical tape 150, which is the recording of information.

When reproducing an image, a light beam having a wavelength different from that used during recording is emitted from reproducing laser 152. The light beam is transmitted through dichromatic filter 153 and focused onto optical tape 150 by objective lens 254. Contrary to the light beam emitted when recording an image, the light beam emitted when reproducing an image does not change the form of writing layer 153 on optical tape 150, and is instead just reflected by reflection layer 152. In the portions of optical tape 150 in which pits 155 are formed, due to the scattering, extinguishment and interference of light, the amount of reflected light is less than at other portions of tape 150. The light beam reflected by optical tape 150 arrives at optical detecting unit 260. Typically, a reproducing signal detected due to the variation of the amount of the reflected light beam, and focus/track error signals detected according to the vertical and horizontal location of the light beam, are output from optical detecting unit 260.

First, a process of detecting the focus error signal using an ordinary knife edge method will be described. The light beam is reflected by optical tape 150 and is reflected again by beam separating prism 261. The reflected beam passes focusing lens 262 and knife edge 263 to be detected by a quadrantal light detecting device 264. If optical tape 150 is within the focal length of objective lens 254, the light beam passes knife edge 263 without being blocked thereby, so as to be formed equally on the left and right of quadrantal light detecting device 264. If optical tape 150 is farther or closer than the focal length of objective lens 254, part of the light beam is blocked by knife edge 263 and the light beam is formed on either the left or right of light detecting device 264. The focus error signal becomes a differential signal for the signals output from the left and right portions of light detecting device 264, and is transmitted to actuator 255 via focus servo 272, so as to compensate for the error by vertically moving objective lens 254.

Next, a process of detecting the track error signal using an ordinary one-beam method will be described. If the light beam emitted from reproducing laser 252 is formed on the center of track T of optical tape 150, the beam is equally distributed in the upper and lower portions of quadrantal light detecting device 264 and thus a signal differentiating the beam is zero. If the light beam deviates from the center of track T, the differential signal is positive or negative and is also transmitted to actuator 255 via tracking servo 271 so as to compensate for the track error. Passing through low pass filter (LPF) 274 and motor driver 275, the signal is also used in controlling the speed of motor 240 or 240' for driving tape take-up reel 140.

Meanwhile, as shown in FIG. 7A, light beam WB emitted from writing laser 261 and light beam RB emitted from reproducing laser 262 are separated one above the other. The separation distance is the distance between writing tracks on optical tape 150. In the initial recording, since there is no writing track on optical tape 150, the tracking servo signal is zero and the circumferential velocities of tape take-up reel 140 and drum 120 are the same. Therefore, optical tape 150 does not travel and only the height thereof varies due to the rotation of drum 120. In this state, starting from the time light beam WB reaches a reference position P, the writing operation is performed. The writing is controlled so as to start immediately after drum 120 has been rotated once. This is made possible by using a simple sensor for recognizing the rotation of drum 120 or motor 230 which drives drum 120.

Figure 8:
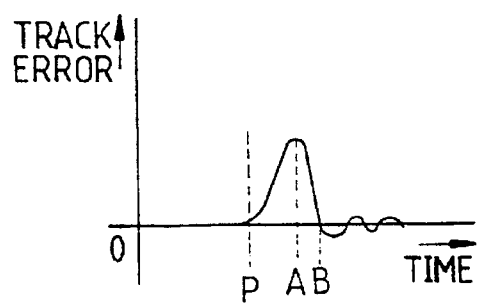
FIG. 8 is a graph for explaining a tracking error signal detected by the optical pickup during recording or reproducing according to the present invention.

Once the writing has begun, when drum 120 is rotated once more and returns to position P, if recording light beam WB is brought down using track jump circuit 273, reproducing light beam RB traces the recorded track T and recording light beam WB records information on a new track T'. The form of the tracking servo signal is illustrated in FIG. 8. Specifically, the tracking servo signal starts track-jumping from zero. At the moment (point A) when the light beam WB strikes the recording track, the track error detected by the light detecting device is maximum. At the moment (point B) when the light beam WB reaches the center of the recording track, the track error becomes zero and the recording is performed from point B. According to this principle, as shown in FIG. 7B, continuous information is recorded on recording track T as T1, T2, T3, T4 and T5.

However, when reproducing light beam RB passes the boundary of optical tape 150, it may lose a target track. To prevent this problem, as in FIG. 7A, a recording track T is divided into T1, T2, T3, T4 and T5 and the recording is carried out in a given sequence. T1 and T2 are solely used for tracking and enables continuous tracing of the beginning and end of the same recording track T. In T3, a specific track number is recorded to recognize a current recording track T. For track-jumping, T4 is a period for recognizing a subsequent track number and jumping to a desired track. In T5, desired information is recorded. If the recording is carried out as above, reproducing light beam RB reads out data recorded in period T5 and continuously traces T1 and T2 of the same track. In T3, the current track is recognized and in T4, the track jumps to a subsequent track (for instance, from track T to track T') to read out period T5 of the subsequent track.

Meanwhile, in tracing the tracks, the focusing location of light beam WB or RB drifts upward. This can be easily solved by controlling motor 240 for driving tape take-up reel 140 according to the detected tracking servo signal.

Generally, in recording an analog video signal, the resolution of the video signal depends upon the writing frequency. For instance, the writing frequency of home VCRs is about 5 MHz and the writing frequency of laser disk drives (which realize higher resolution images than VCRs) is about 8 MHz. Accordingly, in the present invention, a high resolution image can be recorded using a light beam having a high writing frequency.

In the case of recording an image equal to that of a laser disk, since the minimum distance between adjacents pits to be recorded with a laser beam is 1.6 µm (which is the current level of optical recording density), the laser scanning speed on the optical tape is 12.8 m/s (1.6 µm×8 MHz) in the present invention. In order to correspond to present video recording methods which scan 30 frames (60 fields) per second, one field of data is recorded per drum rotation and the circumference of the drum is 21 cm (1280/60) while the diameter thereof is about 7 cm.

If the width of the optical tape used in the present invention is 4 mm, the speed that the optical tape travels along the periphery of the drum is (60×1.6 µm)×(21 cm+4 mm), or 5 mm/s. If an optical tape having the same length (150 m) as a conventional audio cassette tape is used, the present invention can record and reproduce for about eight hours. In the case of HDTV, since the frequency of its video signal is double that of conventional television, four-hour recording is possible. Additionally, if a laser of shorter wavelength is adapted to increase the writing density, the size of the drum can be significantly reduced.

The present invention is able to record and reproduce digital information as well as analog images. In this case, due to the present technology wherein one bit of digital information is recorded per unit area (2.56 µm$^2$), the optical tape can record 30 Gb of digital information. In other words, it has 300 times the capacity of a 100 Mb hard disk.

Accordingly, the present invention can be applied in processing vast information as an auxiliary memory for computers. Further, the present invention has a simplified structure and is easy to handle so that it can be put to practical use, e.g. home use.

What is claimed is:

1. An optical tape cassette comprising:
    a cassette housing having a front and a bottom, a light-passing window on the front thereof and a center hole in a bottom for providing access into an interior of the cassette housing;
    a drum having an upper portion and a lower portion said drum rotatably mounted within the interior of said cassette housing, said drum having a generally cylindrical periphery about which optical tape is slantingly wound between an optical tape outgoing hole and an optical tape incoming hole which are formed on said cylindrical periphery, said drum having a center boss on said lower portion of said drum which is substantially concentric with and accessible through said center hole, said center boss having an inner and outer diameter;
    a tape supply reel having one end of said tape supported thereby rotatably mounted in said upper portion of said drum for supplying said optical tape through said outgoing hole; and
    a tape take-up reel having the other end of said tape supported thereby rotatably mounted in said lower portion of said drum for receiving said optical tape through said incoming hole, said take-up reel having a hub which is substantially concentric with and accessible through said center hole, said hub having an inner diameter greater than said inner diameter of said center boss,
    whereby said boss and said hub are connectable to first and second external rotating members respectively through said center hole.

2. An optical tape cassette as claimed in claim 1, wherein said tape supply reel has fins for producing air turbulence during rotation and creating rotational resistance.

3. An optical tape cassette as claimed in claim 1, wherein said optical tape is wound more than once about the periphery of said drum.

4. An optical tape cassette as claimed in claim 1, wherein said outgoing hole and incoming hole are symmetrically positioned relative to a support shaft on said drum.

5. An optical tape cassette as claimed in claim 1, wherein a magnet member is provided in said center boss of the drum for connection to said first external rotating member.

6. An optical tape cassette as claimed in claim 1, wherein a permanent magnet is provided in said hub of said tape take-up reel for connection to the second external rotating member.

7. An optical tape cassette as claimed in claim 1, wherein a support shaft for passing through a center of said tape supply reel is provided on said drum.

8. An optical tape cassette as claimed in claim 1, further comprising means in said tape supply reel for producing air turbulence during rotation and creating rotational resistance.

9. An optical tape cassette as claimed in claim 8, wherein the means for producing air turbulence and rotational resistance comprises fins on said tape supply reel.

* * * * *